United States Patent [19]

Choquet

[11] Patent Number: 5,140,415
[45] Date of Patent: Aug. 18, 1992

[54] METHOD OF ADJUSTING STEREOSCOPIC CONVERGENCE IN A STEREOSCOPIC IMAGING SYSTEM

[75] Inventor: Bruno Choquet, Rennes, France

[73] Assignees: L'Etat Français représenté par le Ministre des P.T.E. (Centre National d'Etudes des Télécommunications - (CNET), Issy-les-Moulineaux; Télédiffusion de France, société anonyme, Paris, both of France

[21] Appl. No.: 664,290

[22] Filed: Mar. 6, 1991

[30] Foreign Application Priority Data

Mar. 19, 1990 [FR] France ............... 90 03459

[51] Int. Cl.$^5$ .................. H04N 13/00; H04N 15/00
[52] U.S. Cl. .......................... 358/88; 358/3
[58] Field of Search ............ 358/88, 3, 89–92

[56] References Cited

U.S. PATENT DOCUMENTS 4,677,468  6/1987  Morishita .................. 358/88
4,969,735  11/1990  Gilligan .................... 358/88

FOREIGN PATENT DOCUMENTS 2555846  6/1983  France .
2517916  5/1985  France .
0038915  2/1990  Japan .................... 358/88

Primary Examiner—James J. Groody
Assistant Examiner—Michael H. Lee
Attorney, Agent, or Firm—Wegner, Cantor, Mueller & Player

[57] ABSTRACT

The stereoscopic convergence is adjusted in stereoscopic imaging equipment to increase or decrease the stereoscopic convergence angle. Two imaging devices are disposed symmetrically relative to a median optical axis to generate video signals representing images of an observed scene. Depending on the required stereoscopic convergence angle, two image "read windows" are positioned symmetrically relative to the median optical axis, each being defined by a first pixel and a last pixel of a processed image line. The first and last pixels of a processed line are disposed between the first and last pixels of a raw (oversize) image line, with the result that the video signals generated by the stereoscopic imaging equipment represent righthand and lefthand processed images in corresponding relationship to the raw image read windows.

3 Claims, 1 Drawing Sheet

METHOD OF ADJUSTING STEREOSCOPIC CONVERGENCE IN A STEREOSCOPIC IMAGING SYSTEM

BACKGROUND OF THE INVENTION

1. Field of the Invention

The invention concerns a method of adjusting stereoscopic convergence in stereoscopic imaging equipment to increase or decrease the stereoscopic convergence angle in equipment which comprises two imaging devices such as CCD or like video cameras disposed symmetrically relative to a median optical axis. The equipment generates video signals representing a righthand image and a lefthand image of an observed scene so that reproduction of the images on a stereoscopic television screen produces a three-dimensional view of the observed scene, in the known manner. Depending on the imaging conditions, an object in the observed scene may be perceived at the surface of the television screen, "inside the television" or "in front of" the television screen. The three-dimensional effect is therefore conditioned by the imaging conditions. The stereoscopic convergence angle of the righthand and lefthand imaging axes is a crucial parameter of the imaging conditions, its variation producing the three-dimensional effects mentioned above.

The invention also concerns imaging equipment for implementing this method of adjusting stereoscopic convergence.

2. Description of the Prior Art

In known stereoscopic imaging equipment of the type mentioned above each camera is mounted on a rotating support driven by a stepper motor. The stereoscopic convergence is adjusted by setting the optical axes of the cameras to a required convergence angle by appropriate actuation of the stepper motors.

However, this kind of mechanical adjustment of the stereoscopic convergence angle requires very sophisticated equipment for maneuvering the cameras which is difficult to use if accurate adjustments are to be achieved. Equipment of this kind is also subject to frequent malfunctions, especially if the stereoscopic imaging equipment has to be transported.

The invention is directed to remedying the drawbacks mentioned above. In particular, a first object of the invention is to provide a method of adjusting stereoscopic convergence which does not use mechanical means such as those known from the prior art.

A second object of the invention is to provide an accurate and highly reliable method of adjusting stereoscopic convergence.

A third object of the invention is to provide stereoscopic imaging equipment for implementing the method which integrates electronic means for adjusting stereoscopic convergence which are of relatively low cost and which render the equipment homogeneous in terms of technology.

SUMMARY OF THE INVENTION

In one aspect, the present invention consists in a method for adjusting the stereoscopic convergence angle in stereoscopic imaging equipment comprising two devices for imaging an observed scene, the imaging devices being symmetrically disposed relative to a median optical axis to generate first video signals representing a lefthand oversize image and a righthand oversize image of the observed scene, in which method:

said first video signals are digitized to generate digital data representing pixels of said lefthand and righthand oversize images, depending on the required stereoscopic convergence angle, a subset of the pixels of said lefthand and righthand oversize images are selected by positioning two pixel "read windows" each defined by a first pixel and a last pixel of a processed image line, said first and last pixels of a processed image line lying between first and last pixels of an oversize image line, and the selected pixels are converted to analog form to generate second video signals representing a lefthand processed image and a righthand processed image of the observed scene.

Note that in the method in accordance with the invention the imaging devices or cameras remain fixed relative to each other independently of the convergence angle adjustment. This is particularly advantageous with regard to the design of the camera support, as a conventional support may be used.

In another aspect, the present invention consists in stereoscopic imaging equipment comprising two devices for imaging an observed scene disposed symmetrically relative to a median optical axis, in which equipment:

the imaging devices each comprise an opto-electrical sensor for generating first video signals representing a lefthand oversize image and a righthand oversize image of the observed scene, the equipment comprising analog-to-digital converter means connected to said opto-electrical sensors to generate digital data representing image points of said lefthand and righthand oversize images from said first video signals, first memory means connected to said analog-to-digital converter means to store said digital data, control means receiving at their input a stereoscopic convergence angle value and designed to extract from said memory means a subset of the stored digital data depending on said convergence angle value and digital-to-analog converter means receiving said extracted digital data and designed to provide second video signals representing a righthand processed image and a lefthand processed image of the observed scene.

Apart from the fact that the electronic devices mentioned above are homogeneous in terms of their technology with the imaging devices, which are themselves basically electronic devices, the same electronic devices can advantageously be incorporated into the housing of each camera, so avoiding any risk of damage and of malfunctioning. Also, the stereoscopic convergence adjustment is controlled by a control circuit such as a microprocessor or microcomputer offering great flexibility and in particular comprehensive imaging possibilities.

The equipment in accordance with the invention may further comprise second memory means connected in parallel to said first memory means between said video converter means and designed to operate symmetrically and alternately in read mode and in write mode.

Other characteristics and advantages of the invention will emerge from the following description given by way of non-limiting example only and with reference to the appended diagrammatic drawings.

DETAILED DESCRIPTION OF THE INVENTION

Figure 1:
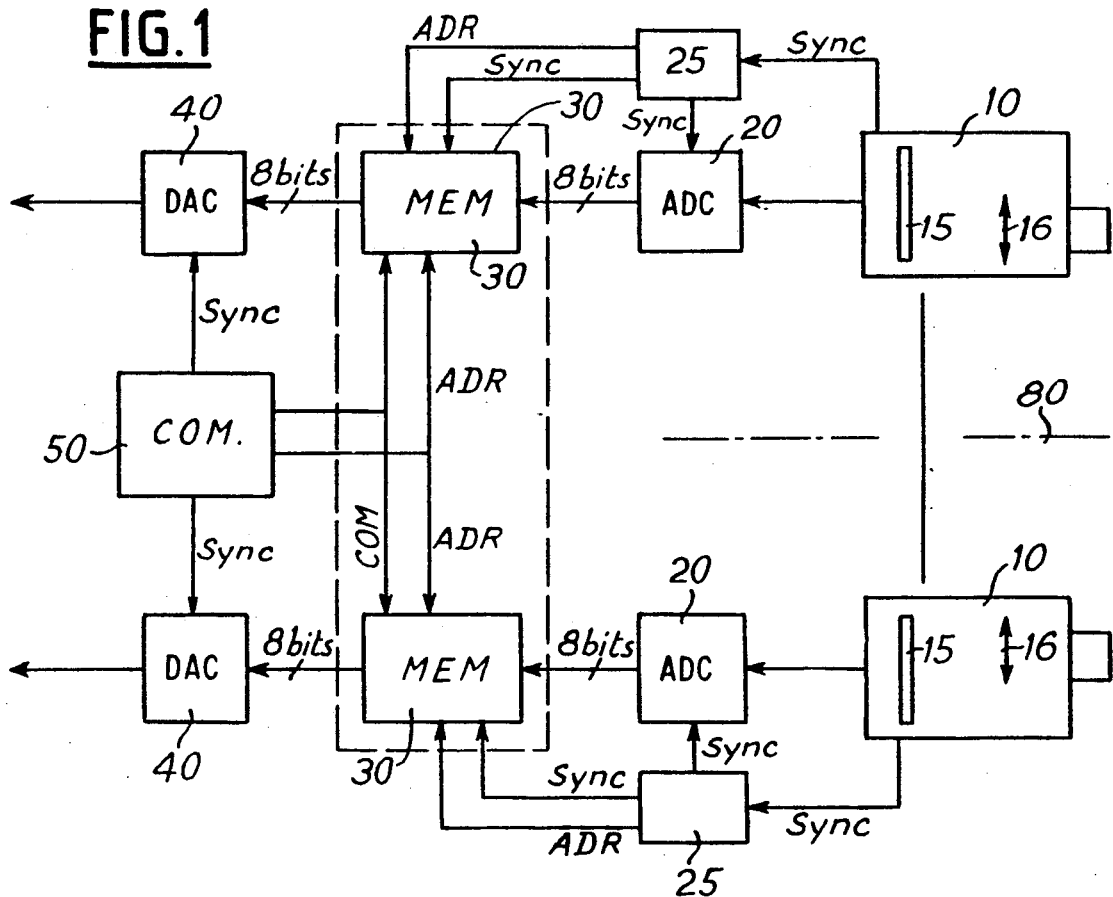
FIG. 1 shows stereoscopic imaging equipment in accordance with the invention.
Figure 3:
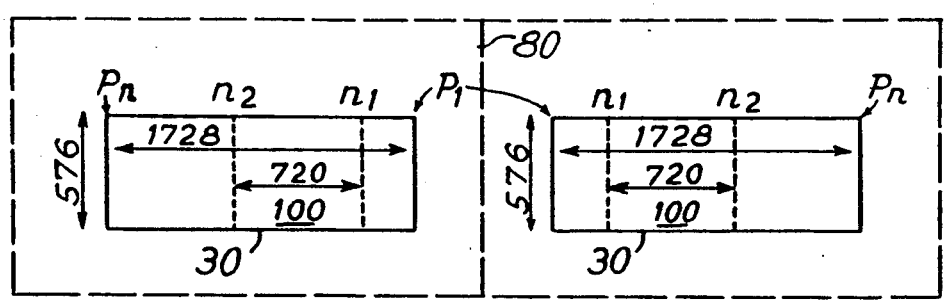
FIG. 3 shows schematically the digital data extraction means in the first memory means.

Referring to FIG. 1, the stereoscopic imaging equipment comprises two imaging devices 10 such as CCD or like video cameras symmetrically disposed relative to a median optical axis 80. The cameras 10 are fixed to a support (not shown) with a specific and variable distance (or "stereoscopic base") between them.

The cameras 10 are designed to generate raw video signals representing a righthand raw (oversize) image and a lefthand raw (oversize) image of an observed scene. Each camera comprises an optical focusing means such as lenses and an image sensor 15 the normal to which is parallel to the optical axis of the optical device 16. The two image sensors 15 in the cameras 10 are preferably coplanar. The image sensors are substantially rectangular in shape and are chosen so that their horizontal dimension expressed as a number of picture elements (pixels) per image line is greater than the horizontal dimension of a processed (final size) image. According to the European standard, a processed video image comprises 576 lines each of 720 pixels. The image sensors in the imaging equipment in accordance with the invention have a horizontal dimension significantly greater than 720 pixels, for example a horizontal dimension of 1 728 pixels. Such sensors are commercially available, in the form of Tektronix TK 2048M sensors, for example.

Electronic circuitry (not shown in this figure) is integrated into each image sensor to generate a raw video signal representing a raw image of the observed scene, the dimensions of the raw image depending on those of the image sensor. It will be understood that each camera 10 is equipped with the same sensor and the same electronic circuitry.

Each sensor 15 has its output connected via the electronic circuitry to a digital-to-analog converter (DAC) 20 receiving at its input the video signal representing one raw image (the righthand raw image, for example) and providing at its output digital data (on eight bits, for example) representing the brightness of the pixels of the image. Each video converter 20 has its output connected to memory means (MEM) 30 such as a random access memory to store said digital data. The memories 30 are preferably adapted to store the digital data in the form of a table of 1 728 × 576 digital data words in corresponding relationship to the configuration of the pixels of an image. Each memory 30 is loaded with pixels line by line. An electronic circuit 25 is adapted to synchronize the video converters 20 and the memory means 30 configured in write mode on the basis of synchronization signals supplied by the cameras 10 and to place the digital data generated by the video converters 20 into the memory locations assigned to them in the memories 30.

Each memory 30 is read in a sliding window 100 shown in FIG. 1B and the size of a processed image (720 × 576 pixels) to determine a processed image, the convergence angle being directly proportional to the horizontal position of said window 100 in each memory 30. To make the invention easier to understand, it will be assumed that each of the images formed by the cameras 10 is represented in the form of a rectangle corresponding to the virtual tabular configuration of the memory 30. Thus each image is defined by a first pixel $P_1$ and a last pixel $P_n$ of an image line and stored in each memory 30 in physical form while each read window 100 is defined by a first pixel $N_1$ and a last pixel $N_2$ of a processed image line. FIG. 1 shows that the read windows 100 are symmetrically positioned in each memory 30 relative to the median optical axis 80. It is also assumed that $N_1$ and $N_2$ represent column addresses of the digital data table, the difference between $N_1$ and $N_2$ being 720. The imaging axes joining the center of the image formed on each sensor to the associated optical center 16 are convergent, the convergence angle varying between 0 (convergent at infinity) and approximately 50 milliradians, this latter value depending on the sensor size and the focal length of the optical system. Each sensor 15 is so disposed in the imaging device 10 that the first pixel $N_1$ on a processed image line is in corresponding relationship to the first pixel $P_1$ of an image line formed for a null convergence. The value of the horizontal dimension of the sensor 15 is such that the last pixel $N_2$ of a processed image line is in corresponding relationship to the last pixel $P_n$ of an image line formed for the maximal convergence, 50 milliradians, for example. In this example it is assumed that the value of $P_1$ is 1 and that the value of $P_n$ is 1 728. The various positions of the first and last pixels $N_1$ and $N_2$ of a processed image relative to the first and last pixels $P_1$ and $P_n$ of a raw image where the difference between $N_1$ and $N_2$ is constant determine a plurality of stereoscopic convergence angles from 0 through 50 milliradians, for example. It will therefore be understood that on moving the read windows 100 towards each other the stereoscopic convergence angle tends towards a null value and that on moving them apart the convergence angle tends towards a maximal value determined by the specifications of the imaging devices.

Each memory 30 is connected to control means 50 such as a microprocessor-based control unit adapted to generate address signals selecting memory locations in the memory 30 so that a read command extracts from the digital data table only the part of a table representing a read window 100, as appropriate to a predetermined convergence angle, and to supply said extracted digital data to a video digital-to-analog converter (DAC) 40. Each video converter 40 generates a video signal representing the processed image for one read window 100. The video converters 40 can with advantage be synchronized by the control unit 50. The address signals generated by the control unit 50 activate all memory locations of the memory 30 for which the column in the digital data table is between $N_1$ and $N_2$.

It will be understood that the memories 30 are read synchronously and that the memory 30 read phase is initiated after the digital data representing an image line, an image frame or a raw image has been completely stored. After each reading of the memories 30, the latter are automatically updated on the basis of new raw images in order to repeat the operation as described above. The convergence angle can be set by an operator using a keyboard or like device connected to the control unit 50 or set automatically by electronic means internal to the stereoscopic imaging equipment. The adjustment of stereoscopic convergence by the method in accordance with the invention is achieved solely by moving a read window in the means for storing digital data representing the brightness of the pixels of the raw images.

Figure 2:
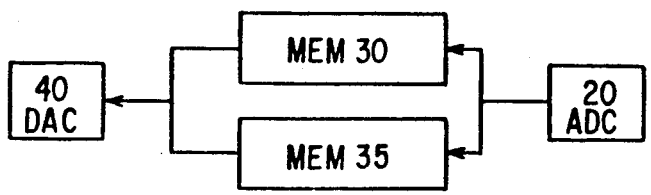
FIG. 2 shows the first and second digital data memory means of the stereoscopic imaging equipment in accordance with the invention.

Second random access memory means 35 identical to the memories 30 are preferably provided, connected in parallel with the first memory means 30 between the two video converters 20 and 40, as shown in FIG. 2. The first and second memory means 30, 35 operate symmetrically and alternately in read mode and write mode, the first storing the digital data provided by the video converter 20 and the second supplying the digital data representing a read window to the video converter 40, and vice-versa. In this way, it is possible to reduce the memory capacity, because memories 30, 35 need only store the digital data representing one image line. For example, the memory capacity can be reduced to approximately 2 kbytes.

In the case of a color imaging system, the cameras 10 obviously comprise three sensors 15 disposed behind the optics 16. In this case it will be necessary to provide three memories 30 and three memories 35 associated with each sensor 15. Other circuits of the imaging equipment will also need to be triplicated, including the video converters 20, 40.

Of course, the invention is not limited to the embodiment described above which is subject to modification without departing from the scope of the invention.

There is claimed:

1. Method for adjusting the stereoscopic convergence angle in stereoscopic imaging equipment comprising two devices for imaging an observed scene, the imaging devices being symmetrically disposed relative to a median optical axis to generate first video signals representing a lefthand oversize image and a righthand oversize image of the observed scene, comprising the steps of:

digitizing said first video signals to generate digital data representing pixels of said lefthand and righthand oversize images;

selecting a subset of the pixels of said lefthand and righthand oversize images, depending on the required stereoscopic convergence angle, by positioning two pixel "read windows" each defined by a first pixel and a last pixel of a processed image line of standard size, said first and last pixels of a processed image line of standard size lying between first and last pixels of an oversize image line; and converting the selected pixels to analog form to generate second video signals representing a lefthand processed image and a righthand processed image of the observed scene.

2. Stereoscopic imaging equipment comprising two devices for imaging an observed scene disposed symmetrically relative to a median optical axis, comprising:

imaging devices each including an opto-electrical sensor for generating first video signals representing a lefthand oversize image and a righthand oversize image of the observed scene;

analog-to-digital converter means connected to said opto-electrical sensors to generate digital data representing image points of said lefthand and righthand oversize images from said first video signals;

first memory means connected to said analog-to-digital converter means to store said digital data;

control means receiving at their input a stereoscopic convergence angle value and designed to extract from said memory means a subset of the stored digital data representing a portion of a processed image line of standard size depending on said convergence angle value; and digital-to-analog converter means receiving said extracted digital data and designed to provide second video signals representing a righthand processed image and a lefthand processed image of the observed scene.

3. Equipment according to claim 2 further comprising second memory means connected in parallel to said first memory means between said video converter means and designed to operate symmetrically and alternately in read mode and in write mode, wherein said first memory means and said second memory means each stores one image line at a given time.

* * * * *